United States Patent [19]
Harvey

[11] Patent Number: 5,423,564
[45] Date of Patent: Jun. 13, 1995

[54] BICYCLE FRAME

[75] Inventor: Matthew S. Harvey, San Francisco, Calif.

[73] Assignee: Bianchi U.S.A., Inc., Hayward, Calif.

[21] Appl. No.: 121,758

[22] Filed: Sep. 15, 1993

[51] Int. Cl.6 ............................................. B62K 19/20
[52] U.S. Cl. ................................. 280/281.1; 228/175
[58] Field of Search .................. 280/281.1, 274, 283, 280/275; 228/175

[56] References Cited

U.S. PATENT DOCUMENTS

| | | | |
|---|---|---|---|
| 3,860,265 | 1/1975 | Weiss | 280/281.1 |
| 4,497,428 | 2/1985 | Baumann | 228/175 |
| 4,565,383 | 1/1986 | Isaac | 280/281.1 |

FOREIGN PATENT DOCUMENTS

| | | | |
|---|---|---|---|
| 2245520 | 4/1975 | France | 280/281.1 |
| 2226095 | 6/1990 | United Kingdom | 280/281.1 |

Primary Examiner—Margaret A. Focarino
Assistant Examiner—Kevin Hurley
Attorney, Agent, or Firm—Feix & Feix

[57] ABSTRACT

The forward triangle of a bicycle frame incorporates steel lug pieces which are made out of ordinary tube sections, without collars. The end of the lug tube is readily and inexpensively shaped by a simple mitering operation to fit at any particular location and at any particular angle for any particular frame size or frame geometry. The shaped end of the lug tube is pulse tungsten inert gas (TIG) welded to the related frame structure. The weld area can be heat treated, prior to the brazing of a frame tube, so that only the relatively short tube lengths of the lug tube and associated frame structure need to be subjected to the heat treatment temperatures. An all steel frame is constructed by brazing a steel alloy frame tubes into each related lug tube and onto the associated frame structure. This forms a connection which utilizes the strength of the TIG weld and brazing, the elasticity of the brazing, and the damping of shock frequencies resulting from the combination of the steel and brass materials. Carbon fiber frames are constructed by gluing carbon fiber frame tubes to the TIG welded steel alloy lug tubes and associated inner, TIG welded, support tubes. The physical qualities of the steel alloy parts are closely matched to the physical qualities of the carbon fiber frame tubes to provide a strong, lightweight, front triangle, bicycle frame which is not subject to catastrophic failure of metal parts.

41 Claims, 3 Drawing Sheets

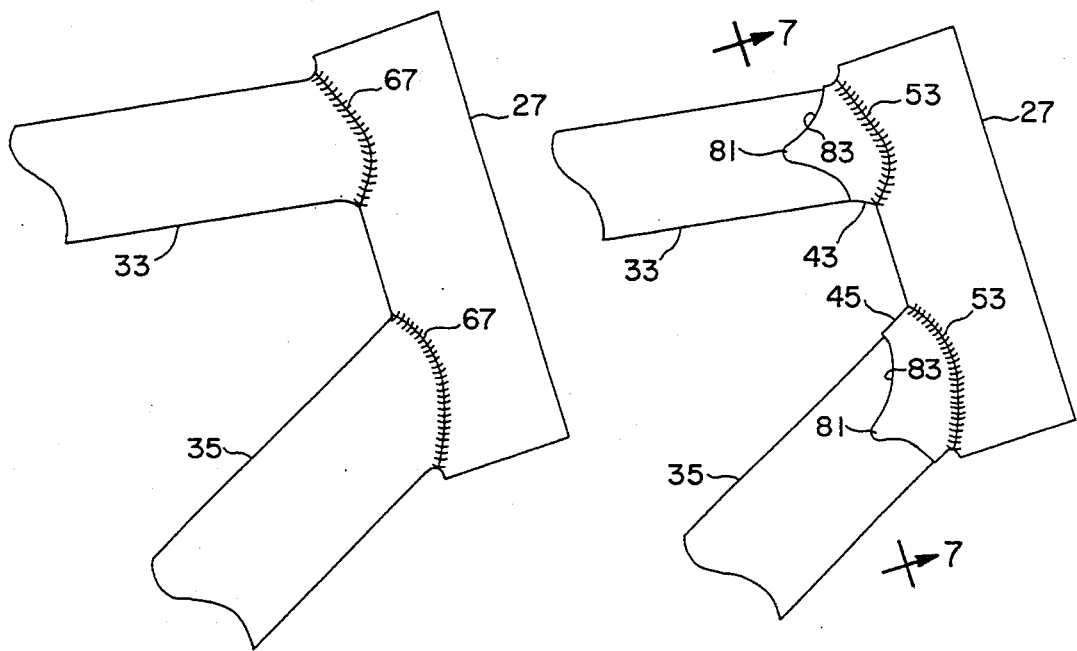
FIG. 4
PRIOR ART
FIG. 5
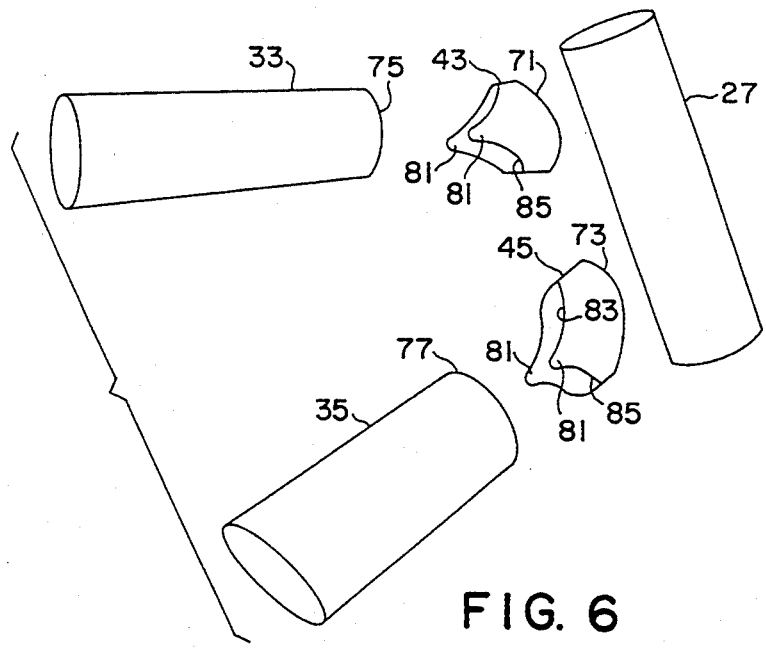
FIG. 6

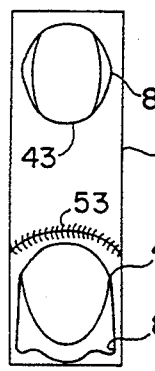
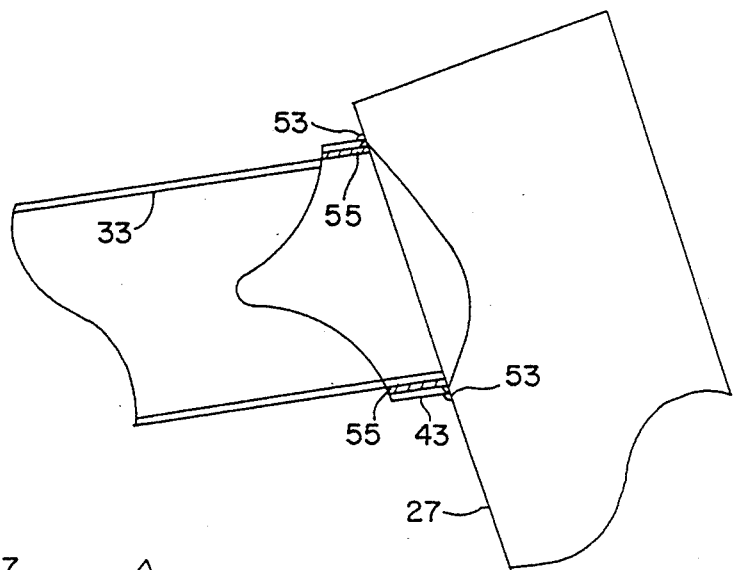
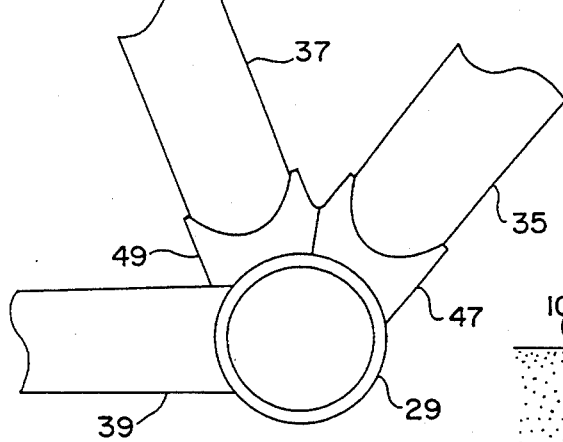
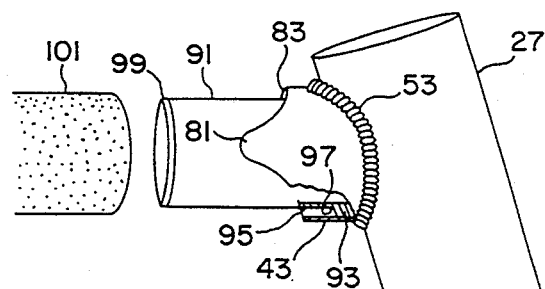
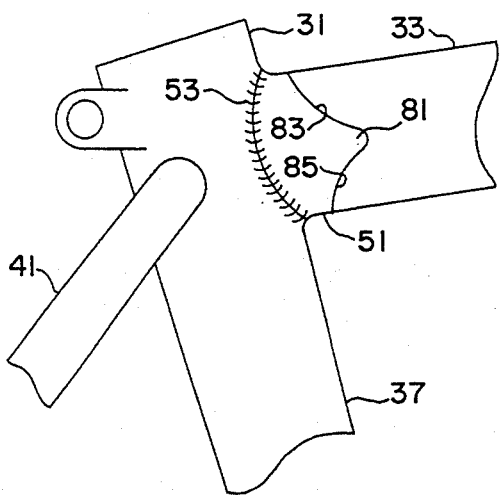
FIG. 7
FIG. 8
FIG. 9
FIG. 10
FIG. 11

BICYCLE FRAME

BACKGROUND OF THE INVENTION

This invention relates to constructions of the forward triangular frame of a bicycle.

This invention relates particularly to the use of steel lug tubes which are tungsten inert gas (TIG) welded and brazed in steel frame sets and which are TIG welded and glued in carbon fiber frame sets.

A brazed, lugged connection is well known and is widely used in traditional, steel bicycle frames.

TIG welding of frame tubes directly to associated frame structures is also well known and widely used in traditional, lugless bicycle frames.

The prior art brazed, lugged frames and the prior art direct TIG welded frames have a number of disadvantages.

The lugs which have been traditionally used to construct lugged steel bicycle frames have incorporated a collar (for encircling a related frame structure, such as, for example, a head tube) in addition to having a short tubular portion which is brazed to a related frame tube.

The traditional, collared lugs were connected to and were brazed to both the frame tube and the related frame structure. Such brazed, collared, lugged connections provided a durable, generally satisfactory, structural connection.

The main disadvantages of the traditional, lugged frame construction have been (1) the overall weight involved in the finished connection, (2) the complex geometry of the collared lug, and (3) the cost involved in producing suitable lugs for different size frames and frequent changes in frame geometries.

Each collared lug at each frame connection location must be complexly curved to achieve the close fit required at the juncture of the frame tube and the related frame structure. A different location of the connection (to accommodate a change in frame size or a change in frame geometry) usually required a different curvature of the surfaces of the collared lug.

The collared lugs have traditionally been made either by complex rolling operations on a sheet of low carbon steel or by individual investment castings. Both lug fabrication techniques required a significant investment for the apparatus needed to produce a specific lug shape and curvature.

When limited production runs of a large number of different frame sizes and frame geometries are required, the traditional, collared, lugged frame construction has drawbacks because of the special apparatus required to fabricate the lugs and the costs associated with the special apparatus required to fabricate the lugs.

Also, the prior art, traditional, lugged frame sets often required a costly, special jig to hold each different size frame set or each different geometry frame set in alignment during brazing.

A relatively large amount of brazing material has also been required to finish a brazed connection in the traditional, collared lugged frames. The brazing material, which is heavy, can make the frame heavier than desired.

The prior art TIG welded frame sets eliminated lugs by TIG welding a frame tube directly to an associated frame part (such as, for example, the head tube).

The disadvantages of the prior art TIG welded frame (as compared to a lugged frame) include less frame strength, less frame stiffness, less frame shock dampening and less frame life.

The strength of a TIG weld area generally is less than the strength of the frame tube alloy material.

The weld area also tends to be brittle, if it is not heat treated.

Heat treating of the TIG welds (in the prior art, direct TIG welded frame set) was so difficult that it usually was not done. Heat treatment of all the welds required exposing the entire frame set to the heat treating temperatures. That could cause the frame set to get out of alignment.

Because of the reduced strength and brittleness in the TIG welded areas, the traditional, TIG welded frame sets usually had a shorter useful life than the traditional, lugged frame sets.

The material is a TIG weld is a hard, unyielding material (as compared to the softer brazing material). The brazing material is relatively elastic and tends to absorb and to dampen road shock. But the direct TIG weld connection does not provide any effective damping.

The TIG weld is essentially a linear connection and cannot distribute forces applied at the connection evenly down the frame.

The brazing material in a lugged connection can distribute forces evenly down the frame.

As a result of all of these factors, the way a bike rides and feels down the road is different with a brazed, lugged frame than it is with a direct TIG welded frame.

TIG welds do not add lateral stiffness to the frame.

Lugs do add lateral stiffness.

The prior art, traditional, TIG welded frame set can also get to be relatively expensive when efforts are made to minimize the weight of a frame set. To reduce the weight of a frame set, the frame tubes are of smaller thickness in the mid part of the tube than at the ends. But relatively large thicknesses at the ends of the tubes are needed to insure adequate thickness for a TIG weld. The frame tubes are usually seamless tubes which are formed by rolling a sheet and seam welding the sheet. However, the tubes are sometimes drawn tubes, instead of being folded over and seam welded tubes. Drawn tubes maximize tube strength and minimize tube weight. But drawn tubes of varied thicknesses at different parts of the tube can become very expensive to make.

It is an important object of the present invention to combine the best features of the prior art lugged frame construction and the prior art TIG welded frame construction, while eliminating or avoiding problems inherent in each of those prior art, traditional frame construction techniques.

A third, traditional, frame construction has incorporated carbon fiber frame tubes and cast aluminum lugs.

The failure point for such carbon fiber bicycle frames usually has not been the carbon fiber.

The failure point has instead usually been the aluminum lugs to which the carbon fiber frame tubes are glued.

The traditional, aluminum lugs have generally been heavy cast pieces which are brittle and which can fail catastrophically if not properly designed.

The cast aluminum lugs are subject to sudden (catastrophic) failure with little or no warning (in contrast to the failure mode of a steel part, which will usually give some prior, warning, high pitched, squealing sound).

It is another important object of the present invention to integrate outer, steel alloy, lug tubes with carbon fiber frame tubes (and with steel inner support tubes) to create structures which are lightweight, yet much stronger and more durable than the prior art, heavy, cast aluminum pieces.

It is a related object of the present invention to combine steel lug tubes with carbon fiber frame tubes in a frame which combines the best qualities of steel alloy lug tubes and carbon fiber frame tubes and to achieve a laterally stiff, yet radially compliant ride for the serious bicycle rider.

SUMMARY OF THE PRESENT INVENTION

In all embodiments of the present invention, the lug pieces are made out of ordinary tube sections, without collars. The end of the lug tube, without a collar, is readily and inexpensively shaped (by simple, mitering operation) to fit onto the outer surface of a related frame structure at any particular location, and at any particular angle for any particular frame size and frame geometry.

The tube sections are alloy steel, preferably 4130 chrome-moly alloy steel.

In two embodiments of the present invention, the shaped end of a lug tube is TIG welded to the related frame structure before a frame tube is connected to the lug tube.

The weld area is heat treated prior to the brazing of a steel alloy frame tube to the lug tube and associated frame structure. Thus, only the relatively short tube lengths of the lug tube and the associated frame structure need to be subjected to the heat treatment temperatures.

The heat treatment of the weld area can therefore be done (1) without applying the heat treating energy to the entire bicycle frame and (2) without introducing problems of frame distortion which could arise from heating treating the entire frame.

In two embodiments of the invention in which the bicycle frame is an all steel bicycle frame, an end of a frame tube is shaped to fit within the steel lug tube and onto the surface of the related frame structure at the particular location of the TIG welded steel lug tube. This end shaping of the frame tube is also done by a simple mitering operation and does not require any special jig set.

In one embodiment of the invention the shaped end of the frame tube is brazed to the outer surface of the related frame part after the associated lug tube has been TIG welded to the related frame part. The outer surface of the frame tube is also brazed to the inner, facing surface of the lug tube.

In a second embodiment of the present invention, the shaped end of a lug tube and the shaped end of a related frame tube are aligned, and the lug tube is spot welded to the related frame tube (to keep the shaped ends in alignment) before the lug tube is TIG welded to a related frame part.

The outer, steel lug tube is then TIG welded (by pulsed TIG welding) to a related frame part at the particular location desired for a specific frame size and frame geometry.

In this second embodiment, the steel lug tube and the steel frame tube are then brazed, through the concentric space between the tubes, to form a connection of the steel frame tube to the steel lug tube and to the related steel frame structure.

The TIG welded and brazed lugged connections utilize the strength of the TIG weld and the brazing, the elasticity of the brazing, and the damping of shock frequencies resulting from the combination of the steel and brass materials.

The shaped ends of the steel frame tubes and the steel lug tubes can always be shaped by an inexpensive and relatively simple mitering process. Fully lugged frames of various sizes and geometries can be economically manufactured (1) without the need for an expensive, specific, precision frame jig for each different size or frame geometry and (2) without the need for expensive rolling or casting operations to form specific, collared lug structures and geometries for each different frame size or frame geometry.

It is a feature of all the embodiments of the present invention that the steel lug tubes are shaped to provide convex, complexly curved side reinforcement ears (without any sharp, pointed formation) on the sides of the lug tubes.

These side reinforcement ears increase the lateral stiffness of the bicycle frame.

Each lug tube is also shaped to provide concave curvatures and relieved areas at the top and at the bottom of each lug tube.

These relieved areas allow vertical flexibility and compliance of the bicycle frame. These configurations in the lug tubes permit vertical flexing and springiness in the frame when a wheel goes over a bump and provide lateral stiffness to prevent undesired flexing during hard pumping of the pedals.

In a third embodiment of the invention, a steel alloy inner support tube is mitered to fit onto the outer surface of a related steel alloy frame structure at a particular location and for a particular frame geometry. This shaped end is then TIG welded to the frame structure before a related, outer lug tube is TIG welded to the frame structure at that location.

An outer lug tube (having an end mitered to fit the frame structure at that particular location) is then slipped over the inner support tube and TIG welded to the related support structure.

The TIG welds are then heat treated to anneal the TIG welded areas prior to connecting a carbon fiber frame tube to the lug tube and the inner support tube.

The end of a carbon fiber frame tube is then inserted into the annular space between the inner support tube and the outer lug tube, until the carbon fiber frame tube engages a radially extending stop on the inner support tube.

Glue is then injected into the connection to glue the carbon fiber tube to the steel inner support tube and to the steel outer lug tube.

The steps described above are for each connection of a carbon fiber frame tube to related steel frame structure to complete the bicycle frame.

The physical qualities of the carbon fiber frame tube are closely matched to the physical qualities of the steel alloy parts to provide a strong, lightweight, front triangle, bicycle frame which is not subject to catastrophic failure of metal parts.

Methods and apparatus which embody the features described above and which are effective to function as described above comprise further, specific objects of the present invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is a side elevation view of a lugged steel bicycle frame constructed in accordance with one embodiment of the present invention. In the FIG. 1 embodiment all of the lugged connections in the forward triangular frame embody the strength of steel and brazing and the elasticity of brazing. All of the lugged connections effectively dampen shock frequencies because of the combination of the properties of the steel and brass materials.

FIG. 4 is a fragmentary, enlarged, side elevation view of a prior art, steel bicycle frame head tube assembly in which steel frame tubes are TIG welded directly to a steel head tube.

FIG. 5 is a fragmentary, enlarged, side elevation view of a head tube assembly constructed in accordance with one embodiment of the present invention. In the embodiment shown in FIG. 5, all of the components (the head tube, the lug tubes, and the frame tubes) are steel; and the frame tube to head tube connections incorporate the strength of the TIG weld and the brazing and also achieve the elasticity of the brazing.

FIG. 6 is an isometric exploded view of the component parts of the head tube assembly shown in FIG. 5.

FIG. 7 is an end elevation view, taken generally along the line and in the direction indicated by the arrows 7—7 in FIG. 5, showing steel lug tubes TIG welded to a steel head tube in accordance with the present invention. FIG. 7 shows the TIG welded lug tube to head tube structure ready for the insertion of frame tubes and the subsequent brazing of the frame tubes to the lug tubes and to the head tube. The welded tube structure shown in FIG. 7 is heat treated prior to the low temperature brazing of the frame tubes.

FIG. 8 is a fragmentary, enlarged, side elevation view, partly broken away and in cross section, showing details of the structure of the connection of the frame top tube to the head tube and to the lug tube. FIG. 8 is an enlarged showing of the top part of the head tube assembly shown in FIG. 5.

Figure 1:
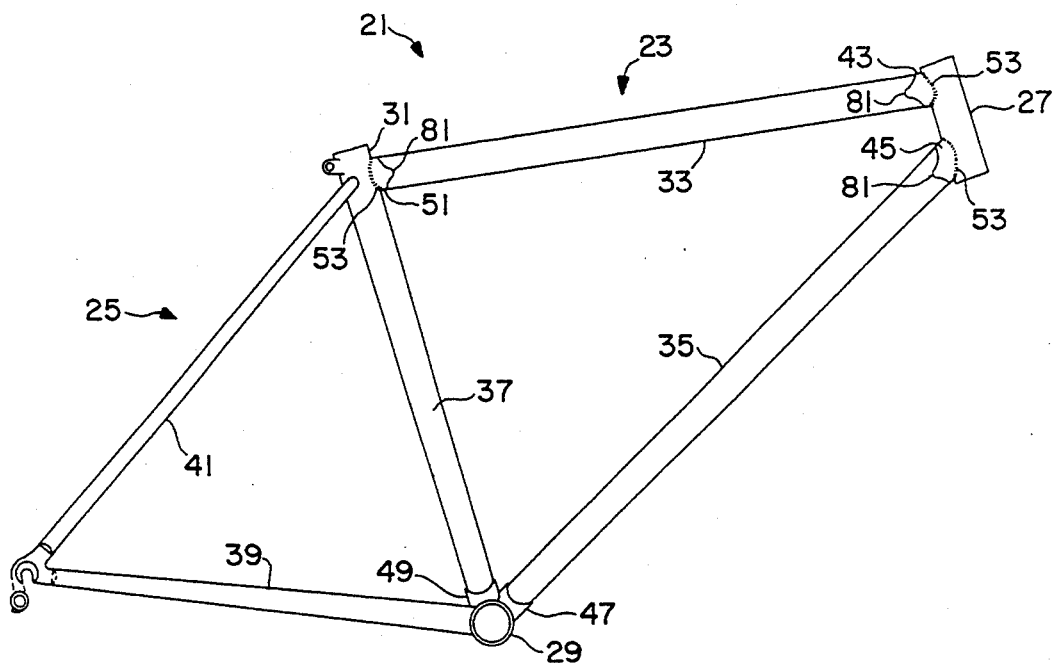

FIG. 9 is a fragmentary, enlarged, side elevation view, of the steel bottom bracket assembly of the bicycle frame shown in FIG. 1.

FIG. 10 is a fragmentary, enlarged, side elevation view of the seat tube assembly of the steel bicycle frame shown in FIG. 1.

FIG. 11 is a fragmentary, enlarged, partly exploded, side elevation view of the head tube assembly of a bicycle frame constructed in accordance with another embodiment of the present invention. In the FIG. 11 embodiment the front triangle of the bicycle frame embodies steel lugs and carbon fiber frame tubes to provide a strong, lightweight frame which is not subject to catastrophic failure of any metal parts.

DETAILED DESCRIPTION OF THE PREFERRED EMBODIMENTS

A lugged, steel bicycle frame constructed in accordance with one embodiment of the present invention is indicated by the general reference numeral 21 in FIG. 1.

The bicycle frame 21 includes a forward triangular frame 23 and a rear triangular frame 25.

In the FIG. 1 embodiment all of the lugged connections in the forward triangular frame 23 incorporate the strength of steel and brazing and also achieve the elasticity of brazing. All of the lugged connections effectively dampen shock frequencies because of the combination of the properties of the steel and brass materials.

The forward triangular frame 23 includes a steel alloy head tube 27, a steel bottom bracket 29, and an externally butted top end structure 31 of a steel alloy seat tube 37.

The front triangular frame 23 includes a steel alloy top tube 33, a steel alloy down tube 35 and the steel alloy seat tube 37.

The rear triangular frame includes steel alloy tubes 39 and 41.

In accordance with the present invention steel alloy lug tubes 43, 45, 47, 49 and 51 are incorporated in the connections of the frame tubes to the head tube 27, the bottom bracket 29, and the externally butted top end structure 31.

In the embodiment of the invention shown in FIG. 1, the lug tubes 43, 45 and 51 are connected by pulsed TIG (tungsten inert gas) welds 53 to the related head tube 27 and externally butted top end structure 31, as will be described in more detail below.

In the embodiment of the invention shown in FIG. 1, the bottom bracket 29 has the outer lug tubes 47 and 49 formed integrally with the bottom bracket, as will also be described in more detail below.

Each frame tube is connected to the related bicycle frame structure and to its associated lug tube by brazing, as will also be described in more detail below with specific reference to FIG. 8.

It is an important feature of the present invention that all of the lugged connections in the forward triangular frame 23 of the bicycle frame embodiment shown in FIG. 1 incorporate the strength of steel and brazing and also achieve the elasticity of brazing. All of the lugged connections dampen shock frequencies because of the beneficial combination of the properties of the steel and brass materials.

A brazed, lugged connection is a well known and a widely utilized technique in prior art bicycle frame constructions. The prior art brazed, lugged structure will be described in more detail below with reference to FIGS. 2 and 3.

TIG welding of frame tubes directly to associated frame structures is also a well known bicycle frame construction technique. This prior art direct TIG welded structure will be described in more detail below with reference to FIG. 4.

The prior art brazed, lugged frame construction technique and the prior art direct TIG welded frame construction technique have a number of disadvantages which are overcome by the present invention.

Figure 2:
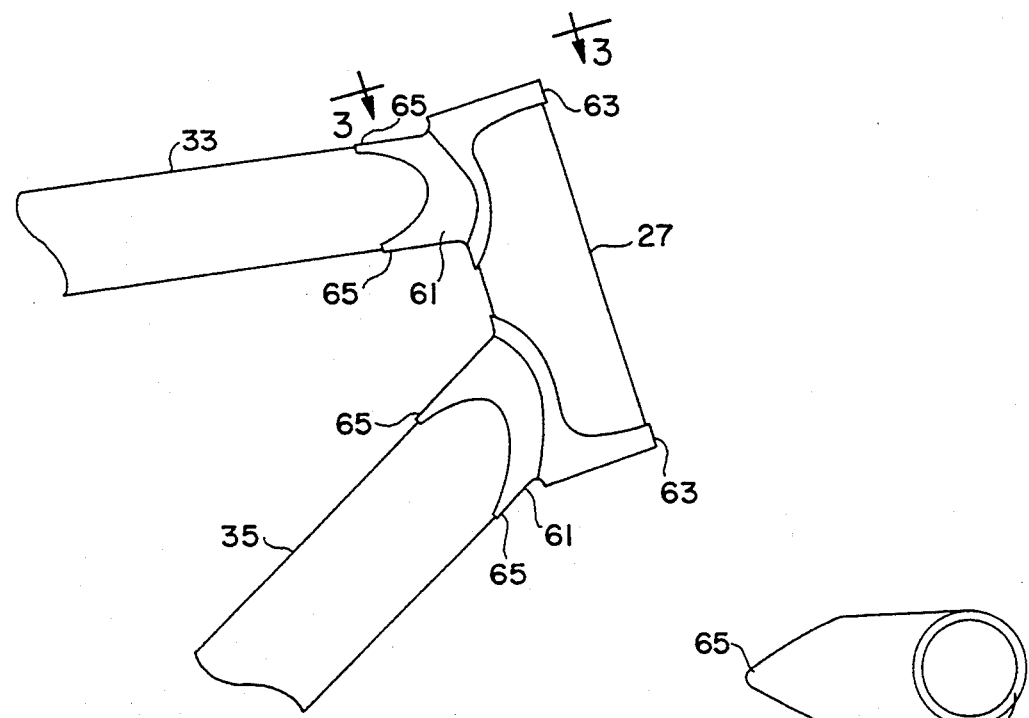
FIG. 2 is a fragmentary, enlarged, side elevation view of head tube assembly of a bicycle frame embodying a prior art lugged frame construction.
Figure 3:
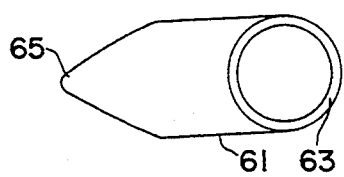
FIG. 3 is a plan view, taken generally along the line and in the direction indicated by the arrows 3—3 in FIG. 2, of a collar type lug used in the prior art bicycle frame construction shown in FIG. 2.

As shown in FIGS. 2 and 3 the lugs 61 which have traditionally been used (to construct lugged steel bicycle frame sets) have incorporated a collar 63 for encircling a related frame structure (such as the head tube 27 shown in FIG. 2) in addition to having a short tubular portion for receiving and retaining a related frame tube (such as the top tube 33 or the down tube 35 shown in FIG. 2).

The prior art collared lugs 61 were connected to and were brazed to both the frame tube and head tube. The brazed, collared, lugged connection provided a durable, generally satisfactory, structural connection.

The main disadvantages of this prior art type of lugged structural connection have been (1) the overall weight involved in the finished connection, (2) the complex geometry of the collared lug, and (3) the cost involved in producing suitable lugs 61 for different size frames and changes in frame geometries.

Each lug at each frame connection location must be complexly curved to achieve the close fit required at the juncture of the head tube and the frame tube. A different location of the connection (to accommodate a change in frame size or a change in frame geometry) usually requires a different configuration of the curvature of the surfaces of the lug 61.

The lugs 61 have traditionally been made either by complex rolling operations on a sheet of low carbon steel or by individual investment castings. Both lug fabrication techniques require a significant investment for the apparatus needed to produce a specific lug shape and curvature.

When limited production runs of a large number of different frame sizes and frame geometries are required, the traditional lugged frame construction (shown in FIGS. 2 and 3) has drawbacks because of the special apparatus and the costs associated with the special apparatus required to fabricate the lugs.

Also, for the prior art lugged frame sets, a relatively costly special jig has often been required to hold each different size frame set or each different geometry frame set in alignment during brazing.

A relatively large amount of brazing material has also been required to finish a brazed connection in the traditional, prior art, lugged frame set shown in FIGS. 2 and 3. The brazing material, which is relatively heavy, can make the frame set heavier than desired.

As shown in FIG. 2, the traditional lugs were often formed with a peak or a point 65 (see also FIG. 3) at the top and bottom of the associated frame tube. This pointed configuration 65 tended to operate like the point of a can opener during the transmission of vertical forces through the frame set. The relatively sharp point 65 acted as a stress riser and sometimes caused the associated frame tube, such as the top tube 33, to fail at the top of the tube at the exact location of the relatively sharp point 65.

The prior art TIG welded frame sets (as shown in FIG. 4) eliminated lugs by TIG welding a frame tube directly to an associated frame part (such as the head tube 27 shown in FIG. 4). See the TIG welds 67 in FIG. 4.

The disadvantages of the prior art TIG welded frame (as compared to a lugged frame) includes less frame strength, less frame stiffness, less frame shock dampening and less frame life.

The strength of a TIG weld area 67 generally is less than the strength of the tube alloy material. The weld area also tends to be brittle, if it is not heat treated.

Heat treating the TIG welds (in the prior art direct TIG welded frame set shown in FIG. 4) was so difficult that it usually was not done. Heat treatment of all the welds required exposing the entire frame set to the heat treating temperatures. This could cause the frame set to get out of alignment.

Because of the reduced strength and brittleness in the TIG weld areas, the prior art TIG welded frame sets usually had a shorter useful life than the prior art lugged frame sets shown in FIG. 2.

The TIG weld area 67 is a hard, unyielding material (as compared to the relatively soft brazing material). The relatively soft brazing material is relatively elastic and tends to absorb and to dampen road shock. But the direct TIG weld 67 connection shown in FIG. 4 does not provide any effective damping.

The TIG weld 67 is essentially a linear connection and cannot distribute forces applied at the connection evenly down the frame.

The brazing material and the lugged connection shown in FIG. 2 can distribute forces evenly down the frame.

As a result of all these factors, the way a bike rides and feels down the road is different with a brazed, lugged frame than it is with a direct TIG welded frame.

The TIG welds 67 do not add lateral stiffness to the frame.

Lugs do add lateral stiffness.

The prior art TIG welded construction shown in FIG. 4 can also get to be relatively expensive when efforts are made to minimize the weight of a frame set. To reduce the weight of a frame set, the frame tubes (like the top tube 33 and the down tube 35 shown in FIG. 4) are of smaller thickness in the mid part of the tube than at the ends. But relatively large thickness at the ends of the tubes are needed to insure adequate thickness for a TIG weld. The frame tubes are usually seamless tubes which are formed by rolling a sheet and seam welding the sheet. However, the tubes are sometimes drawn tubes instead of being folded over and seam welded tubes. Drawn tubes maximize tube strength and minimize tube weight. But drawn tubes of varied thicknesses at different parts of the tube can become very expensive to make.

The present invention combines the best features of the prior art lugged frame set construction and the prior art TIG welded frame set construction, while eliminating or avoiding problems inherent in each of those prior art frame set construction techniques.

In the present invention the lug pieces are made out of ordinary tube sections, without collars. The end of the lug tube, without a collar, is readily and inexpensively shaped (by a simple mitering operation) to fit onto the outer surface of a related frame structure at any particular location at any particular angle for any particular frame size and frame geometry.

This shaped end of the lug tube is then TIG welded to the related frame structure.

The weld area is heat treated, prior to the brazing of a frame tube to the lug tube and associated frame structure, so that only the relatively short tube lengths of the lug tube and associated frame structure need to be subjected to the heat treatment temperatures.

The heat treatment of the weld area can therefore be done (1) without applying the heat treating energy to the entire bicycle frame and (2) without introducing problems of frame distortion which could arise from heat treating the entire frame.

In the embodiments of the invention in which the bicycle frame is an all steel bicycle frame, an end of a frame tube is shaped to fit within the steel lug tube and onto the surface of the related frame structure at the particular location of the TIG welded steel lug tube. This end shaping is also done by a simple cutting (mitering) operation and does not require any special jig set.

The shaped end of the frame tube is then brazed to the outer surface of the related frame part while the outer surface of the frame tube is brazed to the inner facing surface of the lug tube in one specific embodiment of the present invention.

This specific embodiment is best illustrated in FIGS. 6, 7 and 8 of the drawings.

As shown in the exploded view of FIG. 6, the steel lug tubes 43 and 45 have shaped ends 71 and 73 which are mitered to fit onto the outer surface of the head tube 27 at the specific locations, and at the specific angles desired, for a particular frame set size and geometry.

These shaped ends are TIG welded at 53 to the head tube 27.

The TIG welds 53 are then heat treated. In one specific embodiment of the present invention (in which the steel frame tubes, the steel head tube and the steel lug tubes are 4130 chrome-moly steel) the heat treatment heats the weld areas to a temperature in the range of 700 degrees centigrade to 750 degrees centigrade for a period of time sufficient to produce annealing of the welded areas.

The subsequent brazing of the frame tubes, described in more detail below, is then done at a temperature which is well below the unstable two phase state of the alloy steel.

The top tube 33 has an end 75 shaped by mitering to fit onto the outer surface of the head tube 27, and the down tube 35 has an end 77 shaped by mitering to fit onto the surface of the head tube 27. These frame tubes are inserted into the related lug tubes and are then brazed to the head tube and to the related lug tubes by brazing 55 (see FIG. 8).

In a specific embodiment of the present invention the brazing is done with a silver brazing alloy which comprises ten to twenty percent silver and the balance brass.

The completed, TIG welded lug tube and brazed frame tube connection of the head tube assembly is shown in FIG. 5.

As best shown in FIG. 10, the other end of the top tube 33 is connected to the top end 31 of an externally butted steel seat tube 37. This connection includes a steel lug tube 51 which is TIG welded, at 53, to the top end 31.

The ends of the steel lug tube 51 and the top tube 33 are mitered to fit onto the outer surface of the top end 31 of the externally butted steel seat tube at the particular location required for a particular frame size and frame geometry.

The end of the top tube 33 is brazed to the top end 31 and to the interior of the steel lug tube 51 to form a connection which utilizes the strength of the TIG weld and the strength of the brazing material. The connection also benefits from the elasticity of the brazing material.

In the specific embodiment of the forward triangular frame 23 shown in FIG. 1, the steel bottom bracket 29 has two steel lugs 47 and 49 formed integral with the steel bottom bracket at particular locations for a particular frame size and geometry.

In this specific embodiment the steel bottom bracket 29 is a relatively low carbon steel, such as, for example, 1020 steel. The entire steel bottom bracket is subjected to high hydraulic pressure to produce the integral lugs 47 and 49.

The lower end of the down tube 35 is brazed into the lug 47, and the lower end of the seat tube 37 is brazed into the lug tube 49.

In a specific frame set of this first embodiment, the seat tube 37 is externally butted at the top end 31 to have a wall thickness of 1.2 millimeters. The seat tube 37 has a wall thickness of 0.6 millimeters in the mid part of the tube.

The lug tube 47 and the lower end of the down tube 35 are formed in an oval shape. The larger diameter of the oval extends perpendicular to the plane of the drawing shown in FIG. 1 so that this end of the tube provides increased lateral stiffness of the bicycle frame.

In this specific frame set each of the steel lug tubes has a thickness of substantially 0.8 millimeters, the frame down tube 35 is a lugged tube having a thickness of substantially 0.7 millimeters at each end and a thickness of substantially 0.4 millimeters in the center part of the tube. The top tube 33 has a thickness of substantially 0.8 millimeters.

The frame tubes 33, 35 and 37, the head tube 27, and the lug tubes 43, 45 and 51 are 4130 chrome-moly alloy steel.

In a second embodiment of the present invention, the lug tubes 47 and 49 on the bottom bracket 29 are separate tubes and have ends (shaped by mitering) to fit onto the outer surface of the steel bottom bracket 29.

The mitered ends of these lug tubes 47 and 49 in the second embodiment are pulse TIG welded to the bottom bracket 29 rather than being pressure formed integral with the bottom bracket as in the first embodiment.

In this second embodiment the shaped end of a lug tube and the shaped end of a related frame tube are aligned. The lug tube is then spot welded to the related frame tube to keep the shaped ends in alignment.

The outer, steel lug tube is then TIG welded (by pulsed TIG welding) to a related frame part at the particular location desired for a specific frame size and frame geometry.

In this second embodiment the steel lug tube and the steel frame tube are then brazed, through the concentric space between the tubes, to form a connection of the steel frame tube to the steel lug tube and to the related steel frame structure. This TIG welded and brazed connection utilizes the strength of the TIG weld and the brazing, the elasticity of the brazing, and the damping of shock frequencies resulting from the combination of the steel and brass materials.

In this second embodiment the shaped ends of the steel frame tube and the steel lug tube are shaped by an inexpensive and relatively simple mitering process. Fully lugged frames of various sizes and geometries can be economically manufactured without the need for an expensive, specific, precision frame jig for each different frame size or frame geometry and without the need for expensive rolling or casting operations to form specific collared lug structures and geometries for each different frame size or frame geometry.

In one particular frame set of this second embodiment the top tube 33 and the seat tube 37 have thicknesses of substantially 0.8 millimeters, the down tube 35 has a thickness of substantially 0.9 millimeters, and each of the steel lug tubes has a thickness of substantially 0.8 millimeters.

All of the steel structures are 4130 chrome-moly alloy steel.

In this second embodiment, the TIG welds 53 can utilize the combined thickness of the lug tube and the frame tube, because the shaped ends are held in alignment (by the spot welds) during the TIG welding. The thickness of the lug tube or the thickness of the frame tube may therefore be selected to be less than that necessary to insure satisfactory TIG welding of either tube by itself. The combined thickness of the aligned ends of the two tubes will in all cases be large enough to insure adequate thickness for a satisfactory TIG weld.

In this second embodiment the steel lug tubes, the steel frame structures and the steel frame tubes are 4130 chrome-moly alloy steel.

The brazing is done with a silver brazing alloy which comprises 10 to 20 percent silver and the balance brass.

The top tube and the seat tube have thicknesses of substantially 0.8 millimeters. The down tube has a thickness of substantially 0.9 millimeters, and each of the steel lug tubes has a thickness of substantially 0.8 millimeters.

The steel alloy frame tubing sets used in five specific frame sets made in accordance with the present invention are the "Prestige Super Lite", "Tange Seamless D.B.T.(0.9/0.6)", "Tange Seamless P.G.", "Prestige", and "Infinity" road racing frame tubing sets specified at pages 11 and 12 of the publication entitled *Tange Frame Components System No. 6* and published in 1990 by Tange USA, Corporation, 268-B Lombard St., Thousand Oaks, Calif. 91360, USA. This publication is incorporated by reference in this application.

It is a feature of all embodiments of the present invention that the steel lug tubes 43, 45 and 51 are shaped to provide convex, complexly curved side reinforcement ears 81 (without any sharp, pointed formation) on the sides of the lug tubes. See FIGS. 5, 6 and 10. These side reinforcement ears 81 increase the lateral stiffness of the bicycle frame.

Each lug tube is also shaped to provide concave curvatures and relieved areas 83 at the top and 85 at the bottom of each lug tube. These relieved areas allow vertical flexibility and compliance of the bicycle frame. These configurations in the lug tubes permit vertical flexing and springiness in the frame when a wheel goes over a bump and provide lateral stiffness to prevent undesired flexing during hard pumping of the pedals.

In cycle life testing on frame set torture machines, the two embodiments (described above) of frames constructed in accordance with the present invention have withstood significantly more cycles than any brand frame set ever previously tested. In torture tests in Europe and Asia the frame sets of the present invention have endured over 160,000 cycles of testing. These frame sets have exceeded by more than 40,000 cycles (more than 43% test duration) the cycles to failure lifetimes of the strongest oversize, steel, direct TIG welded frame sets previously tested. The prior art, oversize, steel, direct TIG welded frame sets failed after less than 120,000 cycles, while the frame sets of the present invention have withstood 165,000 cycles.

The tested frame sets of the present invention were also over a pound lighter than the strongest, oversize, steel, direct TIG welded frame sets previously tested.

A third embodiment of a bicycle frame constructed in accordance with the present invention is shown in FIG. 11.

In this third embodiment the front triangle of the bicycle frame embodies steel lugs and carbon fiber frame tubes to provide a strong, lightweight frame which is not subject to catastrophic failure of any metal parts.

The failure point for carbon fiber bike frames traditionally has not been the carbon fiber.

The failure point has instead been the aluminum lugs to which the carbon fiber frame tubes are glued.

These aluminum lugs are generally heavy cast pieces which are brittle and which can fail if not properly designed.

The cast aluminum lugs are subject to sudden (catastrophic) failure with little or no warning (in contrast to failure of a steel part, which will usually give some prior, warning, squealing sound).

Integrating outer steel lug tubes with carbon fiber frame tubes (and with steel inner support tubes) in accordance with the present invention (as will be described in more detail below) permits creating a junction which is lightweight, yet much stronger and more durable than the heavy cast aluminum pieces. The combination of the steel lug tubes with carbon fiber frame tubes in a frame set combines the best qualities of steel alloy lug tubes and carbon fiber tubes to achieve a laterally stiff, yet radially compliant ride for the serious bicycle rider.

As illustrated in the top, exploded view portion of FIG. 11, this third embodiment of the present invention includes a steel inner support tube 91. The inner support tube has a larger diameter end portion 93, a smaller diameter end portion 95 and a stepped, radially extending, transition surface 97 between the portions 95 and 93. The surface 97 is positioned to engage the related end of a carbon fiber frame tube 101.

The inner support tube also has a rim 99 which fits snugly into the interior of the carbon fiber tube 101 to serve as a stop or dam for retaining the glue which is injected into the lugged connection (as will be described in more detail below) as a final step in the assembly of the connection.

The end of the larger diameter portion 93 of the inner support tube 91 is mitered to fit onto the outer surface of the head tube 27 at the particular location and for the particular frame geometry desired, and this shaped end is then TIG welded to the head tube 27.

The outer lug tube 43 has an internal size and shape large enough to slide over the largest outside diameter portion 93 of the inner support tube and up against the related head tube 27 while leaving an annular space between the inner surface of the lug tube 43 and the smaller outer diameter portion 95 of the support tube. This annular space receives the carbon fiber frame tube 101.

The end surface of the outer lug tube 43 is mitered to fit onto the outer surface of the head tube 27 at the particular location and at the particular angle required for the frame size and frame geometry, and this shaped end is pulse TIG welded to the head tube 27 at that location.

These two TIG welds are then heat treated to anneal the TIG welded areas prior to inserting the end portions of the carbon fiber frame tube 101.

The end of the carbon fiber frame tube 101 is then inserted into the annular space between the steel inner support tube and the steel outer lug tube until it engages the surface 97. Glue is then injected into the connection to glue the carbon fiber frame tube 101 to the steel inner support tube 91 and to the steel outer lug tube 43.

The steps described immediately above are performed for each connection of a carbon fiber frame tube to a related steel frame structure to produce a bicycle frame in which the physical qualities of the carbon fiber frame tube are closely matched to the physical qualities of the steel alloy parts (the steel frame structures, the steel alloy inner support tubes and the steel alloy outer lug tubes) and to provide a strong, lightweight, front triangle, bicycle frame which is not subject to catastrophic failure of metal parts.

In a preferred form of this third embodiment of the present invention the steel frame structures, the steel inner support tubes and the steel outer lug tubes are 4130 chrome-moly alloy steel, the TIG welding is pulsed TIG welding, the heat treating heats the weld areas to temperatures in the range of 700 degrees centigrade to 750 degrees centigrade for a period of time sufficient to provide the annealing effect, and each steel outer lug tube has a thickness substantially 0.8 millimeters.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A method of connecting a steel frame tube to a steel head tube in a bicycle frame, said method comprising,
    shaping an end of a steel lug tube to fit onto an outer surface of a steel head tube at a particular location for a particular frame size and frame geometry,
    tungsten inert gas (TIG) welding a shaped end of the steel lug tube to the steel head tube,
    shaping an end portion of at least one steel frame tube to fit onto the outer surface of the steel head tube and within the steel lug tube at the same particular location,
    inserting the shaped end portion of the steel frame tube into an open end of the steel lug tube and into engagement with the steel head tube, and
    brazing the inserted end portion of the steel frame tube to the steel lug tube and to the steel head tube to form a connection of the steel frame tube to the head tube which incorporates strength characteristics associated with connections made by TIG welding and brazing, a desired elasticity characteristic associated with a brazed connection, and desired shock dampening characteristics resulting from a connection which utilizes a combination of steel and brass materials.

2. The invention defined in claim 1 wherein said at least one steel frame tube comprises a steel top tube and a steel down tube and wherein two steel lug tubes including a first lug tube and a second lug tube are TIG welded to the steel head tube at particular weld areas to define a head tube fitting for receiving the steel top tube and the steel down tube, respectively, for a particular frame size and geometry and including heat treating the weld areas prior to brazing so that only the weld areas and relatively short tube lengths of the head tube fitting and the first and second lug tubes need to be subjected to heat treatment temperatures, whereby the heat treatment of the weld areas can be done without applying heat treating energy to the entire bicycle frame and without introducing problems of frame distortion which could arise from heat treating the entire frame.

3. The invention defined in claim 2 wherein the steel top and down tubes and steel head tube and the first and second lug tubes are 4130 chrome-moly alloy steel and wherein the heat treatment of the weld areas heats the weld areas to a temperature in a range of 700 degrees centigrade to 750 degrees centigrade for a period of time sufficient to produce annealing of the weld areas and wherein brazing is done at a temperature well below an unstable two phase state of 4130 chrome-moly alloy steel.

4. The invention defined in claim 1 wherein the shaped end portion of the steel frame tube is brazed to the steel head tube and the outer surface of the steel frame tube is brazed to an inner surface of the steel lug tube.

5. The invention defined in claim 2 wherein each of the first and second lug tubes has a thickness of substantially 0.8 millimeters, the steel down tube is a lugged tube having a thickness of substantially 0.7 millimeters at each end and a thickness of substantially 0.4 millimeters in a central tube portion thereof.

6. The invention defined in claim 2 including the steps of,
    shaping an end portion of a third steel lug tube to fit onto an outer surface of a top end of an externally butted steel seat tube at a particular location for said particular frame size and frame geometry,
    TIG welding the shaped end portion of the third steel lug tube to the steel seat tube at said particular location to form a third weld area,
    heat treating the third weld area before attaching the steel top tube to the steel seat tube,
    shaping an end portion of the steel top tube to fit onto an outer surface of the steel seat tube and within the third steel lug tube at said particular location on the steel seat tube,
    inserting the shaped end portion of the steel top tube into the third steel lug tube and into engagement with the steel seat tube, and
    brazing the inserted end portion of the steel top tube to the third steel lug tube and to the steel seat tube to form a connection which incorporates strength characteristics associated with TIG welding and brazing and also achieves a desired elasticity characteristic associated with brazing.

7. The invention defined in claim 6 including,
    forming two steel lugs integral with a steel bottom bracket at particular locations for the particular frame size and geometry,
    inserting ends of the steel down tube and the steel frame seat tube into the related integral lugs, and
    brazing the inserted ends of the steel down tube and the steel seat tube to the related integral steel lugs.

8. The invention defined in claim 6 including shaping each of the first, second and third lug tubes to provide convex side reinforcement ears on along opposing sides thereof for increasing lateral stiffness of the bicycle frame and shaping each of the first, second and third lug tubes to provide concave curvatures along top and bottom portions of each of the first, second and third lug tubes and relieved areas in the top and bottom portions of each of the firs, second and third lug tubes for allowing some vertical flexibility and compliance of the bicycle frame.

9. A method of connecting steel frame tubes to a related steel head tube frame structure, a steel bottom bracket frame structure, and an externally butted top end steel frame structure of a seat tube of a bicycle frame, said method comprising, shaping an end of a first steel frame tube to fit onto an outer surface of the related steel frame structure at a particular location for a particular frame size and geometry, selecting a first steel lug tube having an internal size and shape large enough to provide a concentric, relatively snug, sliding fit over an outside surface of the first steel frame tube, shaping an end of the first steel lug tube to fit onto the outer surface of the related steel frame structure at said particular location, aligning the shaped ends of the first steel frame tube and the first steel lug tube and spot welding the first frame tube and first lug tube together to retain their respective shaped ends in a desired alignment, tungsten inert gas (TIG) welding the aligned, shaped end of at least the first steel lug tube to the related steel frame structure at said particular location, brazing the first steel lug tube and the first steel frame tube through the unwelded end of the first steel lug tube and the concentric space between the first steel frame and lug tubes to form a connection of the first steel frame tube to the first steel lug tube and to the related steel frame structure which incorporates strength characteristics associated with connections made by TIG welding and brazing, a desired elasticity characteristic associated with a brazed connection and desired shock dampening resulting from connection which utilizes a combination of steel and brass materials, and performing each of the above steps for each connection of a frame tube to a related steel frame structure.

10. The invention defined in claim 9 wherein the shaped ends of each steel frame tube and each steel lug tube is mitered by a cutting tool so that fully lugged frames of varied sizes and geometries can be economically manufactured without the need for an expensive, specific, precision frame jig for each different frame size or frame geometry and without the need for expensive rolling or casting operations to form specific collared lug structures and geometries for each different frame size or frame geometry.

11. The invention defined in claim 9 wherein a seam formed by the TIG welding extends through the first steel lug tube and at least partially into an aligned end of the first steel frame tube.

12. The invention defined in claim 6 wherein:
the first and second lug tubes and the steel top tube and the steel down tube are connected to the steel head tube,
a third steel lug tube and the steel top tube are connected to the top end of the externally butted steel seat tube, and
two additional steel lug tubes and the steel down tube and the steel seat tube are connected to a steel bottom bracket, and wherein:
the steel top tube and the steel seat tube have thicknesses of substantially 0.8 millimeters and the steel down tube has a thickness of substantially 0.9 millimeters and wherein each of the steel lug tubes has a thickness of substantially 0.8 millimeters.

13. The invention defined in claim 9 wherein the first steel frame tube has a thickness is in a range which may be too small to insure satisfactory TIG welding but an arrangement of the first steel frame tube within the first steel lug tube provides a combined thickness in a range which enables satisfactory TIG welding to be produced.

14. The invention defined in claim 9 wherein all steel lug tubes, steel frame structures and steel frame tubes are 4130 chrome-moly alloy steel.

15. The invention defined in claim 14 wherein the brazing is done with a silver brazing alloy which comprises ten to twenty percent silver and the balance brass.

16. The invention defined in claim 9 including shaping each steel lug tube to provide convex side reinforcement ears along opposing sides of each steel lug tube for increasing lateral stiffness of the bicycle frame and shaping each steel lug tube to provide concave curvatures at top and bottom portions of each steel lug tube and relieved areas in the top and bottom portions of each steel lug tube for allowing some vertical flexibility and compliance of the bicycle frame.

17. A method of connecting carbon fiber frame tubes to a steel head tube frame structure, a steel bottom bracket frame structure, and a steel seat tube junction frame structure of a bicycle frame, said method comprising, shaping an end surface of a steel inner support tube to fit onto an outer surface of a related steel frame structure at a particular location for a particular frame size and frame geometry, said steel inner support tube having a first portion of larger outer diameter which fits onto said steel frame structure, a second portion of reduced outer diameter which slides into a frame tube, and a stepped, radially extending, transition surface between the first and second portions for engaging a related end of a frame tube, tungsten inert gas (TIG) welding the shaped end surface of the inner support tube to the related steel frame structure at said particular location, selecting an outer steel lug tube having an internal size and shape large enough to slide over the larger outer diameter first portion of the inner support tube and up against the related steel frame structure while leaving an annular space between an inner surface of the outer steel lug tube and the reduced outer diameter second portion of the steel inner support tube for receiving a carbon fiber frame tube, shaping an end surface of the outer steel lug tube to fit onto the outer surface of the related steel frame structure at said particular location, TIG welding the shaped end surface of the outer steel lug tube to the related steel frame structure at said particular location, inserting an end portion of a carbon fiber frame tube into the annular space between the steel inner support tube and the outer steel lug tube, gluing the carbon fiber frame tube to the steel inner support tube and to the steel outer lug tube, and performing each of the above steps for each connection of a frame tube to a related steel frame structure to produce a bicycle frame in which physical qualities of the carbon fiber frame tubes are closely matched to physical qualities of the steel frame structure and steel inner support tubes and steel outer lug tubes and to provide a strong, lightweight bicycle frame which is not subject to catastrophic failure of metal parts.

18. The invention defined in claim 17 including heat treating all TIG weld areas to anneal the TIG weld areas prior to inserting the end portions of the carbon fiber frame tubes.

19. The invention defined in claim 18 wherein the steel frame structures, the steel inner support tube and the steel outer lug tube are 4130 chrome-moly alloy steel and wherein the TIG welding is pulsed TIG welding and wherein the heat treating heats the TIG weld areas to temperatures in a range of 700 degrees centigrade to 750 degrees centigrade for a period of time sufficient to provide an annealing effect.

20. The invention defined in claim 19 wherein each steel outer lug tube has a thickness substantially 0.8 millimeters.

21. The invention defined in claim 17 including shaping each outer steel lug tube to provide convex side reinforcement ears along opposing sides of each outer steel lug tube for increasing lateral stiffness of the bicycle frame and shaping each outer steel lug tube to provide concave curvatures at top and bottom portions of each outer steel lug tube and relieved areas in the top and bottom portions of each outer steel lug tube for allowing some vertical flexibility and compliance of the bicycle frame.

22. A lugged steel, front triangle, bicycle frame in which all of the front triangle frame connections embody both the strength of a TIG weld and the elasticity of brazing, said frame comprising,
   a steel head tube frame structure,
   a steel bottom bracket frame structure,
   a steel seat tube having an externally butted top end frame structure,
   a steel top tube connected to the head tube and the externally butted top end of the seat tube,
   a steel down tube connected to the head tube and the bottom bracket,
   a lower end of the steel seat tube connected to the bottom bracket,
   the top and down frame tubes and the lower end of the seat tube having ends shaped to fit onto an outer surface of the related steel frame structures at particular locations for particular frame size and frame geometries,
   outer lug tubes having ends shaped to fit onto the outer surfaces of the related steel frame structures at the particular locations corresponding to said particular locations of a related end of a related frame tube,
   each outer lug tube being spot welded to a related end of a frame tube to hold the shaped ends in alignment prior to attaching the shaped ends to a related steel frame structure at said particular locations,
   each outer lug tube having its shaped end connected by a tungsten inert gas (TIG) weld to a related steel frame structure at said particular location,
   each outer lug tube also being brazed to its associated frame tube to form a connection of the frame tube to the lug tube and to the related frame structure which utilizes strength characteristics of TIG weld and brazed connections, elasticity of a brazed connection and dampening of shock frequencies resulting from a combination of steel and brass materials.

23. The invention defined in claim 22 wherein the ends of the top, down and seat tubes and lug tubes are mitered by a cutting tool so that fully lugged frames of varied sizes and geometries can be economically manufactured without the need for an expensive, specific, precision frame jig for each different frame size or frame geometry and without the need for expensive rolling or casting operations to form specific collared lug structures and geometrics for each different frame size or frame geometry.

24. The invention defined in claim 22 wherein all steel tubes comprise 4130 chrome-moly steel and wherein each braze connection comprises a silver braze having ten to twenty percent silver and the balance brass.

25. The invention defined in claim 22 wherein all TIG weld areas are heat treated prior to brazing the steel top, down and seat tubes to their respective outer lug tubes and to the related steel frame structures.

26. The invention defined in claim 22 wherein the steel top tube and the steel seat tube have thicknesses of substantially 0.8 millimeters and the steel down tube has a thickness of substantially 0.9 millimeters and wherein the steel lug tubes have thicknesses of substantially 0.8 millimeters.

27. The invention defined in claim 22 wherein:
   each steel lug tube is shaped to provide convex side reinforcement ears opposing sides of each lug tube for increasing lateral stiffness of the bicycle frame; and
   each steel lug tube is shaped to provide concave curvatures at top and bottom portions of each lug tube and relieved areas in the top and bottom portions of each lug tube for allowing some vertical flexibility and compliance of the bicycle frame.

28. A lugged steel, front triangle, bicycle frame comprising,
   a steel head tube,
   a first steel outer lug tube having an end shaped to fit onto an outer surface of the steel head tube at a first particular location for a particular frame size and frame geometry and is pulse tungsten inert gas (TIG) welded to the head tube at that first particular location,
   a second outer steel lug tube having an end shaped to fit onto the outer surface of the steel head tube at a second particular location for a particular frame size and frame geometry and is pulse TIG welded to the steel head tube at that second particular location,
   a steel top tube having an end shaped to fit onto the steel head tube at said first particular location and having an end disposed within the first steel outer lug tube and brazed to the first steel outer lug tube and to the steel head tube, and
   a steel down tube having an end shaped to fit onto the steel head tube at said second particular location and having an end disposed within the second outer steel lug tube and brazed to the second outer steel lug tube and to the steel head tube,
   whereby each connection of each of said steel top and down tubes to its related steel outer lug tube and to the steel head tube fitting incorporating strength characteristics of both TIG welded and brazed connections, a desired elasticity characteristic associated with a brazed connection and a desired shock dampening characteristic resulting from a connection which utilizes a combination of steel and brass materials.

29. The invention defined in claim 28 wherein all TIG welded areas are heat treated prior to a brazing of the top, down and seat tubes to their respective outer lug tubes so that only the welded areas and relatively short tube lengths of the head tube and the outer lug tubes need to be subjected to heat treatment temperatures and problems of frame distortion which could arise from heat treating the entire frame are avoided.

30. The invention defined in claim 28 wherein each of the steel top, down and seat tubes, the steel head tube, and the steel lug tubes are 4130 chrome-moly alloy steel.

31. The invention defined in claim 28 wherein the first and second steel outer lug tubes have a thickness of substantially 0.8 millimeters, the down tube is a lugged tube having a thickness of substantially 0.7 millimeters at each end and a thickness of substantially 0.4 millimeters in a central tube portion thereof.

32. The invention defined in claim 28 including a steel bottom bracket formed with integral outer lugs for receiving the steel down tube and a seat tube and including a brazed connection of the steel down tube and the lower end of the seat tube to a respective integrally formed outer lugs.

33. The invention defined in claim 32 including a steel seat tube having an externally butted top end, a third steel outer lug tube having an end shaped to fit onto an outer surface of the top end of the steel seat tube at a location corresponding to the connection of the frame top tube to the seat tube, the top tube also having an end shaped to fit onto the outer surface of the top end of the seat tube at said location, and including a pulsed TIG weld of the outer lug tube to the seat tube and wherein the top tube is brazed to the outer lug tube and to the seat tube.

34. The invention defined in claim 33 wherein the TIG weld of the outer lug tube to the seat tube is heat treated prior to brazing the frame top tube to the outer lug tube and to the seat tube.

35. The invention defined in claim 34 wherein each braze connection comprises a silver braze having ten to twenty percent silver and the balance brass.

36. The invention defined in claim 28 wherein each steel lug tube is shaped to provide convex side reinforcement ears along opposing sides of each lug tube for increasing lateral stiffness of the bicycle frame and each steel lug tube is shaped to provide concave curvatures at top and bottom portions of each lug tube and relieved areas in the top and bottom portions of each lug tube for allowing some vertical flexibility and compliance of the bicycle frame.

37. A steel lugged, carbon fiber frame tube, front triangle, bicycle frame comprising,
a steel head tube frame structure,
a steel bottom bracket frame structure,
a steel seat tube junction frame structure,
a plurality of steel, inner, support tubes each having an end surface shaped to fit onto an outer surface of a related steel frame structure at a location corresponding to a desired connection of a frame tube to that steel frame structure for a particular frame size and frame geometry,
a tungsten inert gas (TIG) weld connecting said shaped end surface of each inner support tube to a related steel frame structure at a desired location,
each inner support tube having a first portion of larger outer diameter which fits onto the related steel frame structure, a second portion of reduced outside diameter which slides into a carbon fiber frame tube, and a stepped, radially extending, transition surface between the first and second portions which engages a related end of an associated carbon fiber frame tube,
a steel outer lug tube associated with each steel inner support tube and having an end shaped to fit onto the outer surface of the related steel frame structure at the location of the desired connection of a related frame tube to the related steel frame structure,
a TIG weld connecting each steel outer lug tube to the related steel frame structure at the desired location,
each steel outer lug tube having an internal size and shape large enough to slide over the larger outer diameter first portion of the related inner support tube while leaving an annular space between an inner surface of each steel outer lug tube and the reduced outside diameter second portion of each inner support tube for receiving a carbon fiber frame tube,
a carbon fiber top tube extending between the steel head tube and the steel seat tube junction and glued to the related steel inner support tube and steel outer lug tube at each end,
a carbon fiber frame down tube extending between the steel head tube and the steel bottom bracket and glued at each end to the related steel inner support tube and steel outer lug tube,
a carbon fiber seat tube extending between the steel seat tube junction and the steel bottom bracket and glued at each end to the related steel inner support tube and steel outer lug tube, and
wherein physical qualities of the carbon fiber tubes are closely matched to physical qualities of the steel frame structures and steel inner support tube and steel outer lug tubes to provide a strong, lightweight frame which is not subject to catastrophic failure of any metal parts.

38. The invention defined in claim 37 wherein the steel is 4130 chrome-moly alloy steel.

39. The invention defined in claim 37 wherein all of the TIG welds are heat treated prior to gluing the carbon fiber frame tubes to the related inner support tubes and outer lug tubes.

40. The invention defined in claim 37 wherein the steel inner support tubes are TIG welded to the related steel frame structures prior to TIG welding the steel outer lug tubes to the related steel frame structures.

41. The invention defined in claim 37 wherein each steel lug tube is shaped to provide convex side reinforcement ears along opposing sides of each steel lug tube for increasing lateral stiffness of the bicycle frame and each steel lug tube is shaped to provide concave curvatures at top and bottom portions of each steel lug tube and relieved areas in the top and bottom portions of each steel lug tube for allowing some vertical flexibility and compliance of the bicycle frame.

* * * * *